US011689606B2

(12) United States Patent
Lu et al.

(10) Patent No.: US 11,689,606 B2
(45) Date of Patent: Jun. 27, 2023

(54) COMMUNICATION METHOD, SYSTEM AND APPARATUS

(71) Applicant: Huawei Technologies Co., Ltd., Shenzhen (CN)

(72) Inventors: Xin Lu, Shenzhen (CN); Jin Chen, Shenzhen (CN); Changhong Hu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 316 days.

(21) Appl. No.: 16/998,139

(22) Filed: Aug. 20, 2020

(65) Prior Publication Data

US 2020/0382578 A1     Dec. 3, 2020

Related U.S. Application Data

(63) Continuation of application No. PCT/CN2019/077578, filed on Mar. 9, 2019.

(30) Foreign Application Priority Data

May 17, 2018    (CN) .......................... 201810473016.2

(51) Int. Cl.
    *H04L 67/10*       (2022.01)
    *H04L 41/08*       (2022.01)
    *H04L 65/1069*     (2022.01)
    *H04L 67/56*       (2022.01)

(52) U.S. Cl.
    CPC .............. *H04L 67/10* (2013.01); *H04L 41/08* (2013.01); *H04L 65/1069* (2013.01); *H04L 67/56* (2022.05)

(58) Field of Classification Search
    CPC ......... H04L 41/08; H04L 45/00; H04L 45/02; H04L 45/04; H04L 45/46; H04L 65/1069; H04L 67/10; H04L 67/1097; H04L 67/56
    See application file for complete search history.

(56) References Cited

U.S. PATENT DOCUMENTS 10,404,598 B1 *   9/2019   Sinn ........................ H04L 45/60
2008/0256079 A1   10/2008   Saha et al.
2013/0322327 A1   12/2013   Jorgensen et al.
(Continued)

FOREIGN PATENT DOCUMENTS

CN         102647335 A     8/2012
CN         104350713 A     2/2015
(Continued)

*Primary Examiner* — Gil H. Lee
(74) *Attorney, Agent, or Firm* — Conley Rose, P.C.

(57) ABSTRACT

A communications system which includes a first data center and a second data center, where the first data center includes a first message proxy, a first routing proxy, a service server, and a storage server and configured to receive a first message from an application running on the service server, add routing information to the first message to generate a second message when the first message is processed by the second data center, and store the second message in a public area of the storage server, where the public area is configured to store a message processed by the second data center. The first routing proxy is configured to obtain the second message from the public area, and send the second message to the second data center based on the routing information.

20 Claims, 8 Drawing Sheets

(56) References Cited

U.S. PATENT DOCUMENTS

| | | | |
|---|---|---|---|
| 2013/0336317 A1 | 12/2013 | Mithyantha et al. | |
| 2013/0336320 A1 | 12/2013 | Rangaraman | |
| 2017/0099181 A1 | 4/2017 | Hawking et al. | |
| 2017/0139736 A1 | 5/2017 | Messerli | |
| 2018/0278610 A1* | 9/2018 | Huang | H04L 67/1095 |
| 2021/0243276 A1* | 8/2021 | Hunt | G06F 9/5038 |

FOREIGN PATENT DOCUMENTS

| | | |
|---|---|---|
| CN | 104365067 A | 2/2015 |
| CN | 104380693 A | 2/2015 |
| CN | 103312624 B | 3/2016 |
| CN | 105472024 A | 4/2016 |
| CN | 105681462 A | 6/2016 |
| CN | 105791082 A | 7/2016 |
| CN | 106130882 A | 11/2016 |
| CN | 103516580 B | 6/2017 |
| CN | 107450999 A | 12/2017 |
| CN | 108712332 A | 10/2018 |
| CN | 106789732 B | 8/2019 |
| WO | 2014189737 A3 | 3/2015 |

\* cited by examiner

COMMUNICATION METHOD, SYSTEM AND APPARATUS

CROSS-REFERENCE TO RELATED APPLICATIONS

This application is a continuation of International Patent Application No. PCT/CN2019/077578 filed on Mar. 9, 2019, which claims priority to Chinese Patent Application No. 201810473016.2 filed on May 17, 2018. The disclosures of the aforementioned applications are hereby incorporated by reference in their entireties.

TECHNICAL FIELD

This disclosure relates to the communications field, and in particular, to a communication method, system and apparatus.

BACKGROUND

A message queuing technology is widely applied to scenarios such as application system communication, message trunking, asynchronous decoupling, and traffic balancing. A single storage server was used to store messages in the past, and a distributed message queue cluster (cluster) including a plurality of storage servers is currently used to store messages, a cluster capability greatly improves reliability, stability, and service capabilities of messages.

Using a cluster, a communication link does not need to be directly established between application systems (applications). Instead, using a cluster as a transit, different applications that need to communicate with each other are connected to a same cluster. The application can serve as a producer of consumption to send a message to a message queue of the cluster. The application may also serve as a consumer, and obtain and process a message in a queue by determining, through monitoring, whether there is a new message in the queue. Decoupling and asynchronous communication are implemented between applications using such a producing and monitoring mode.

The communication between the different applications depends on a same cluster that serves as a transit. In an actual service scenario, as a service requirement becomes complex, the cluster used for inter-application communication has evolved from a single cluster to a plurality of clusters. For example, a plurality of data centers, a plurality of cloud service providers, a plurality of service clusters, and the like need a plurality of clusters for inter-application communication. If applications deployed between different data centers or different service clusters need to send messages to each other and receive messages from each other, one of the clusters needs to be selected as a transit for communication. In this case, application code is required for "intrusion", to configure remote routing information in the applications. On the other hand, applications are gradually developing into distributed deployment. For example, a same application is separately deployed in different data centers, different public cloud environments, or different service clusters. In the foregoing scenario, if one cluster is selected as a transit for different applications, a performance problem inevitably occurs in remote access to the cluster, such as crossing data centers or crossing service clusters, during inter-application communication. In addition, the application needs to be connected to a plurality of clusters at the same time. This also brings a problem of complex route selection processing to the application.

Therefore, how to resolve a problem of a complex route selection processing process of an application becomes an urgent problem to be resolved.

SUMMARY

This disclosure provides a communication method, system, and apparatus, to resolve a problem of a complex route selection processing process of an application in a conventional technical solution.

According to a first aspect, a communications system is provided. The communications system includes at least a first data center and a second data center. The first data center includes a first message proxy, a first routing proxy, a service server, and at least one storage server. An application runs on the service server, and the storage server is configured to store a message sent by the application. The first message proxy is configured to receive a first message sent by a first application, add routing information to the first message to generate a second message when determining that the first message is processed by the second data center, and store the second message in a public area of the storage server. The storage server includes a private area and the public area. The private area is used to store a message processed by the first data center, and the public area is used to store a message processed by the second data center. The first routing proxy is configured to obtain the second message from the public area, and send the second message to the second data center based on the routing information.

According to the description of the communications system, the first message proxy receives the message sent by the application, adds routing information to a message that needs to be processed by another data center, and stores the message in the public area of the storage server. The first routing proxy obtains, from the public area, the message to which the routing information is added, and sends the message to another data center, to complete inter-application communication. In this technical solution, a route selection process of an application is completed by a message proxy and a routing proxy. The application does not need to record information about a message queue cluster serving as a communication transit, but directly sends a message to a message proxy in a same data center. The message proxy confirms routing information, and the routing proxy forwards the message to a remote data center, thereby avoiding a complex process of determining a route by the application. This resolves a problem of complex route selection processing of an application in a conventional technical solution, improves efficiency of inter-application communication, and reduces inter-application communication time. In addition, in this disclosure, the message proxy and the routing proxy complete a process of confirming routing information of an application message, without participation of an application, and there is no need to add configuration information to the application. This avoids "intrusion" of application code, and improves application security.

In a possible implementation, the public area of the storage server includes a first message queue, and the private area includes a second message queue. In this case, that the first message proxy stores the second message in the public area of the storage server includes storing the second message in the second message queue.

When a target message queue cluster is a remote message queue cluster, the public area is used to store a to-be-processed message, and then the routing proxy sends the message to a target message queue cluster of another data center. This implements a communication process in which a local message queue cluster sends a message, a local message queue cluster receives a message, and a consumer determines a route. This resolves the problem of complex route selection processing of an application in the conventional technical solution, improves the efficiency of inter-application communication, and reduces the inter-application communication time.

In another possible implementation, the first message proxy is further configured to before adding the routing information to the first message to generate the second message, determine the routing information based on configuration information, where the configuration information includes a correspondence among identifiers of message queues in different data centers, an identifier of the application that sends the first message, and an identifier of an application that processes the second message.

The routing information may be determined by the first message proxy based on the configuration information, and the application does not need to obtain the configuration information. When receiving the message sent by the application, the first message proxy may determine the routing information based on the configuration information.

In another possible implementation, the communications system further includes a configuration center. The configuration center is configured to store the configuration information. The first message proxy is further configured to before receiving the first message sent by the application running on the service server, obtain the configuration information from the configuration center. The first routing proxy is further configured to before obtaining the second message from the public area, obtain the configuration information from the configuration center.

Optionally, the configuration information may alternatively be recorded and maintained by a third-party server. Correspondingly, before receiving the message sent by the application on the service server, the first message proxy and the first routing proxy first obtain the configuration information from the third-party server.

Optionally, the configuration information may further be recorded and maintained by any server in a data center. Correspondingly, before receiving the message sent by the application on the service server, the first message proxy and the first routing proxy first obtain the configuration information from the server.

The configuration center is mainly configured to record and maintain the configuration information. The first message proxy may obtain the configuration information from the configuration center. When receiving the message sent by the application, the first message proxy may determine routing information based on the configuration information, and quickly determine routing information of the message, and the application does not need to participate in a route determining process. In addition, when the configuration information changes, the first message proxy and the first routing proxy may update locally stored configuration information before receiving the message sent by the application. This ensures accuracy of the routing information, and further improves message processing efficiency.

In another possible implementation, the second data center includes a management server, the management server is configured to manage a storage server in the second data center, and the routing information includes an Internet Protocol (IP) address of the management server. Therefore, that the first routing proxy sends the second message to the second data center based on the routing information includes sending the second message to the management server based on the IP address of the management server such that the management server stores the second message in the storage server in the second data center.

The routing information determined by the message proxy may include the IP address of the management server in the second data center. The routing proxy may send a message to the second data center based on the IP address, and then the second data center completes a process of processing the message.

According to a second aspect, this disclosure provides a communication method. The method is applied to a communications system. The communications system includes at least a first data center and a second data center. The first data center includes a first server, a first message proxy, a first routing proxy, a service server, and a storage server. An application runs on the service server, and the storage server is configured to store a message sent by the application on the service server. The method includes receiving, by the first server, a first message sent by the application running on the service server, when the first message is processed by the second data center, adding routing information to the first message to generate a second message, and storing the second message in a public area of the storage server, where the storage server includes a private area and the public area, the private area is used to store a message processed by the first data center, and the public area is used to store a message processed by the second data center, and obtaining the second message from the public area, and sending the second message to the second data center based on the routing information.

In a possible implementation, the public storage area of the storage server includes a first message queue, and the private area includes a second message queue. In this case, storing, by the first server, the second message in a public area of the storage includes storing the second message in the second message queue.

In another possible implementation, determining, by the first server, that the first message is processed by the second data center includes before adding routing information to the first message to generate a second message, determining the routing information based on configuration information, where the configuration information includes a correspondence among identifiers of message queues in different data centers, an identifier of the application that sends the first message, and an identifier of an application that processes second message.

In another possible implementation, the foregoing system further includes a configuration center configured to store the configuration information. Before receiving the first message sent by the application running on the service server, the first server obtains the configuration information from the configuration center.

In another possible implementation, the second data center includes a management server, the management server is configured to manage a storage server in the second data center, and the routing information includes an IP address of the management server. Therefore, sending, by the first server, the second message to the second data center based on the routing information includes sending the second message to the management server based on the IP address of the management server such that the management server stores the second message in the storage server in the second data center.

According to a third aspect, this disclosure provides a communications apparatus. The communications apparatus is applied to a communications system. The communications system includes at least a first data center and a second data center. The first data center includes a storage server, a first message proxy module, a first routing proxy module, a service server, and a storage server. An application runs on the service server, and the storage server is configured to store a message sent by the application on the service server. The first message proxy module is configured to perform an operation step of implementing any function by the first message proxy according to any one of the first aspect and the possible implementations of the first aspect. The first routing proxy module is configured to perform an operation step of implementing any function by the first message proxy according to any one of the first aspect and the possible implementations of the first aspect.

According to a fourth aspect, this disclosure provides a communications apparatus. The communications apparatus is applied to a communications system. The communications system includes at least a first data center and a second data center. The first data center includes a storage server, a first message proxy module, a first routing proxy module, a service server, and a storage server. An application runs on the service server, and the storage server is configured to store a message sent by the application on the service server. The first message proxy module is configured to perform an operation step of implementing any function by the first message proxy according to any one of the second aspect and the possible implementations of the second aspect. The first routing proxy module is configured to perform an operation step of implementing any function by the first message proxy according to any one of the second aspect and the possible implementations of the second aspect.

According to a fifth aspect, this disclosure provides a server. The server includes a processor and a memory. The processor and the memory are connected to and communicate with each other using a bus. The memory is configured to store a computer-executable instruction. When the server runs, the processor executes the computer-executable instruction in the memory to perform, using a hardware resource in the server, an operation step of implementing a function by the first message proxy according to any one of the first aspect or the possible implementations of the first aspect.

According to a sixth aspect, this disclosure provides a server. The server includes a processor and a memory. The processor and the memory are connected to and communicate with each other using a bus. The memory is configured to store a computer-executable instruction. When the server runs, the processor executes the computer-executable instruction in the memory to perform, using a hardware resource in the server, an operation step of implementing a function by the first routing proxy according to any one of the first aspect or the possible implementations of the first aspect.

According to a seventh aspect, this disclosure provides a server. The server includes a processor and a memory. The processor and the memory are connected to and communicate with each other using a bus. The memory is configured to store a computer-executable instruction. When the server runs, the processor executes the computer-executable instruction in the memory to perform, using a hardware resource in the server, the operation steps of the method according to any one of the second aspect or the possible implementations of the second aspect.

According to an eighth aspect, this disclosure provides a computer-readable storage medium. The computer-readable storage medium stores an instruction, and when the instruction runs on a computer, the computer is enabled to perform the operation steps according to any one of the fifth aspect or possible implementations of the fifth aspect.

According to a ninth aspect, this disclosure provides a computer-readable storage medium. The computer-readable storage medium stores an instruction, and when the instruction runs on a computer, the computer is enabled to perform the operation steps according to any one of the sixth aspect or possible implementations of the sixth aspect.

According to a tenth aspect, this disclosure provides a computer-readable storage medium. The computer-readable storage medium stores an instruction, and when the instruction runs on a computer, the computer is enabled to perform the operation steps according to any one of the seventh aspect or possible implementations of the seventh aspect.

In this disclosure, the implementations provided in the foregoing aspects can be further combined to provide more implementations.

DESCRIPTION OF EMBODIMENTS

The following clearly describes the technical solutions in the embodiments of this disclosure with reference to the accompanying drawings in the embodiments of this disclosure.

To better describe a method based on message queue cluster communication provided in an embodiment of this disclosure, a conventional system and method for inter-application communication are first described with reference to FIG. 1.

Figure 1:
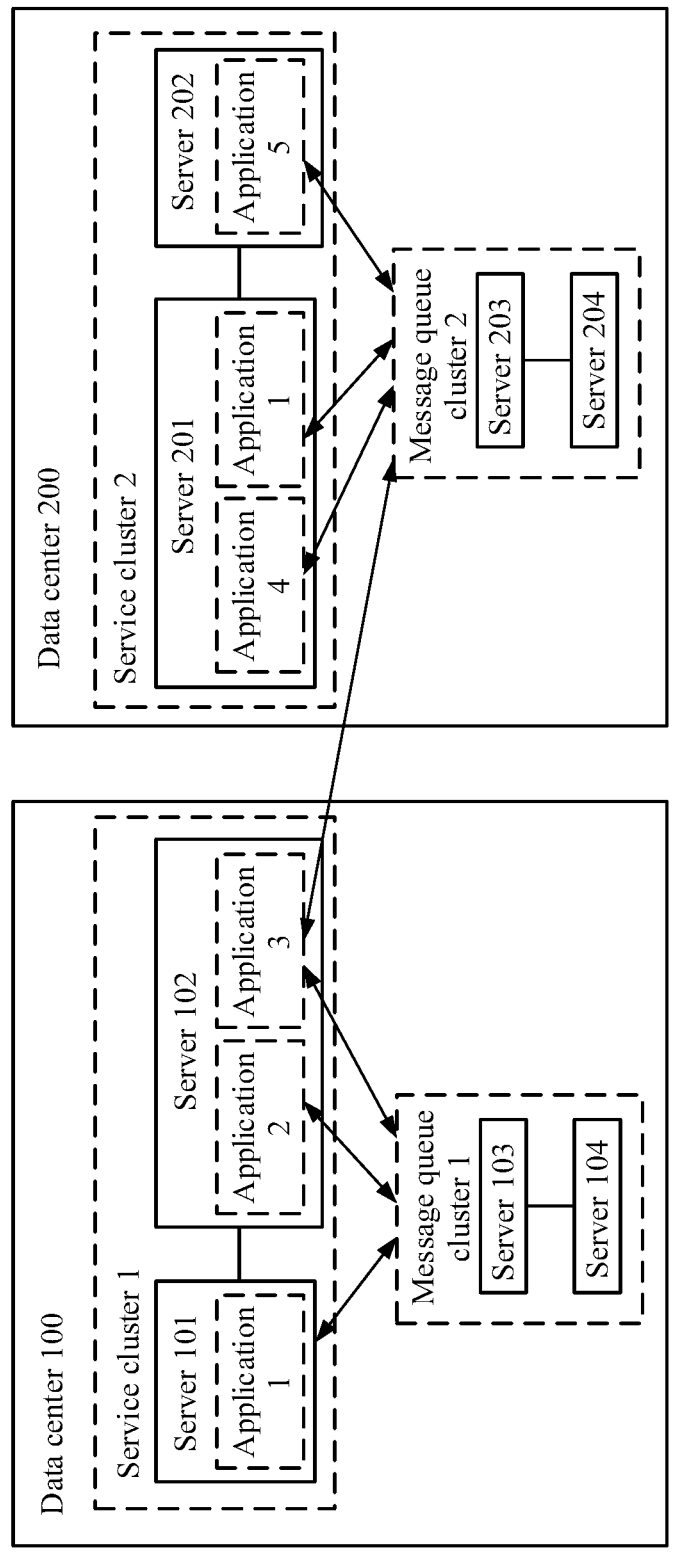
FIG. 1 is a schematic diagram of an architecture of a conventional system based on a message queue cluster communication according to this disclosure.

FIG. 1 is a schematic diagram of an architecture of a conventional communications system. As shown in the figure, the system includes a data center 100 and a data center 200. Each data center includes at least one service cluster and at least one message queue cluster. Different application systems (applications) are deployed in the service cluster. Further, each service cluster includes at least one server, and at least one application is deployed on each server. The server in the service cluster may also be referred to as a service server. The message queue cluster is used as a transit for communication between different applications in a same data center and between different applications in different data centers. A server in the message queue cluster may also be referred to as a storage server, and is configured to temporarily store a message sent by an application. A same message queue cluster may include at least one storage server, and each storage server includes a public area and a private area. The private area includes at least one message queue (each message queue may be referred to as a first message queue), and the at least one message queue is used to store a message processed by a same data center. The public area includes at least one message queue (each message queue may be referred to as a second message queue), the at least one message queue is used to store a message processed by another data center, and the message queue in the public area may also be referred to as a public message queue. In this embodiment, for ease of description, a cluster including one or more service servers is referred to as a service cluster, and a cluster including one or more storage servers that include message queues is referred to as a message queue cluster. A same data center may include at least one message queue cluster. For example, two or more message queue clusters may be configured in a same data center according to a specific service requirement, and each message queue cluster is used as a communication transit of a specified application. In the data centers shown in FIG. 1, that each data center includes one service cluster and one message queue cluster is used as an example. The data center 100 includes a service cluster 1 and a message queue cluster 1. The service cluster 1 includes a server 101 and a server 102. An application 1 is deployed on the server 101, and an application 2 and an application 3 are deployed on the server 102. The data center 200 includes a service cluster 2 and a message queue cluster 2. The service cluster 2 includes a server 201 and a server 202. An application 4 and the application 1 are deployed on the server 201, and an application 5 is deployed on the server 202.

It should be noted that the applications may be deployed in a single-node mode, or may be deployed in a distributed mode. For example, in FIG. 1, the application 2, the application 3, the application 4, and the application 5 are separately deployed on a server in a single-node mode. The application 1 is deployed in a distributed mode, and is separately deployed on the server 101 of the data center 100 and on the server 201 of the data center 200.

The message queue cluster is used for message interaction between different applications. When two applications communicate with each other, a public message queue cluster needs to be selected as a transit. The different applications that communicate with each other need to be separately connected to a same message queue cluster. One application may serve as a producer of consumption, to send a message to a queue in the message queue cluster, and the other application may serve as a consumer. The application is associated with a message queue. The application determines, by monitoring, whether there is a new message in a specified queue and obtains a message in the queue. For example, the application communicates with the specified queue in the message queue cluster in a "long link" manner. That is, the application always monitors a status of the specified message queue. When a to-be-processed message is added to the message queue, the application obtains and processes the message.

The communication between the different applications depends on a same cluster that serves as a transit. In an actual service scenario, as a service requirement becomes complex, the cluster used for inter-application communication has evolved from a single cluster to a plurality of clusters. For example, a plurality of data centers, a plurality of cloud service providers, and the like need a plurality of clusters to be used for inter-application communication. If applications deployed between different data centers or different service clusters need to send messages to each other and receive messages from each other, one of message queue clusters needs to be selected as a transit for communication. In addition, applications are gradually developing into distributed deployment. For example, a same application is separately deployed in different data centers, different public cloud environments, or different service clusters. In the foregoing scenario, if one message queue cluster is selected as a transit for different applications, a performance problem inevitably occurs in remote access to a message queue cluster, such as crossing data centers or crossing clouds, during inter-application communication. In addition, the application needs to be connected to a plurality of clusters at the same time. This also brings a problem of complex route selection processing to the application.

It should be noted that, in an application communication process, for a routing proxy and a message proxy, a message queue cluster that is in a same data center as the routing proxy and the message proxy is referred to as a local message queue cluster, and a message queue cluster that is not in the same data center is referred to as a remote message queue cluster. When an application that processes a message and an application that sends the message are not in a same data center, a data center in which the application that processes the message is located may also be referred to as a remote data center or another data center.

To resolve the foregoing problem, this disclosure provides a method based on message queue cluster communication. When a plurality of message queue clusters are networked, the application only needs to connect to the local message queue cluster. The message can be routed based on a cluster connected to a consumer such that the message can be sent and received locally. This resolves a performance problem occurring in remote access to the remote message queue cluster in an inter-application communications system, and avoids problems of application route selection and code intrusion. A message queue in FIG. 1 is a form of storing messages, and the messages may also be stored in another form, for example, a linked list or a database. For ease of description, the following content of the embodiments of this disclosure further describes the technical solutions provided in the embodiments of this disclosure using an example in which a message queue stores a message.

Each routing proxy and each message proxy obtain configuration information of the system at startup. An application directly communicates with a message proxy in a same data center, and the message proxy determines routing information of a target message queue cluster based on the configuration information that is obtained from a configuration center by the message proxy. When the target message queue cluster includes a message queue of another data center, the message proxy adds routing information to the message to generate a new message, and stores the new message in the public message queue. When detecting that there is a to-be-processed message in the public message queue, the routing proxy sends the new message to another data center based on the routing information in the new message, and then a message queue cluster in another data center stores the new message. Finally, a target application obtains and processes the new message, to resolve problems of low inter-application remote access efficiency, complex route selection processing and high time consumption in a conventional technical solution.

Optionally, a system based on message queue cluster communication may further include a configuration center (CC). The configuration center is used as a globally unified configuration center, and is configured to record a correspondence among identifiers of message queues in different data centers, an identifier of the application that sends a first message, and an identifier of an application that processes a second message. Each routing proxy and each message proxy may also obtain the configuration information from the configuration center at startup.

The following further describes, with reference to FIG. 2A, FIG. 2B, FIG. 3A and FIG. 3B, the method based on message queue cluster communication provided in this embodiment of this disclosure.

Figure 2A:
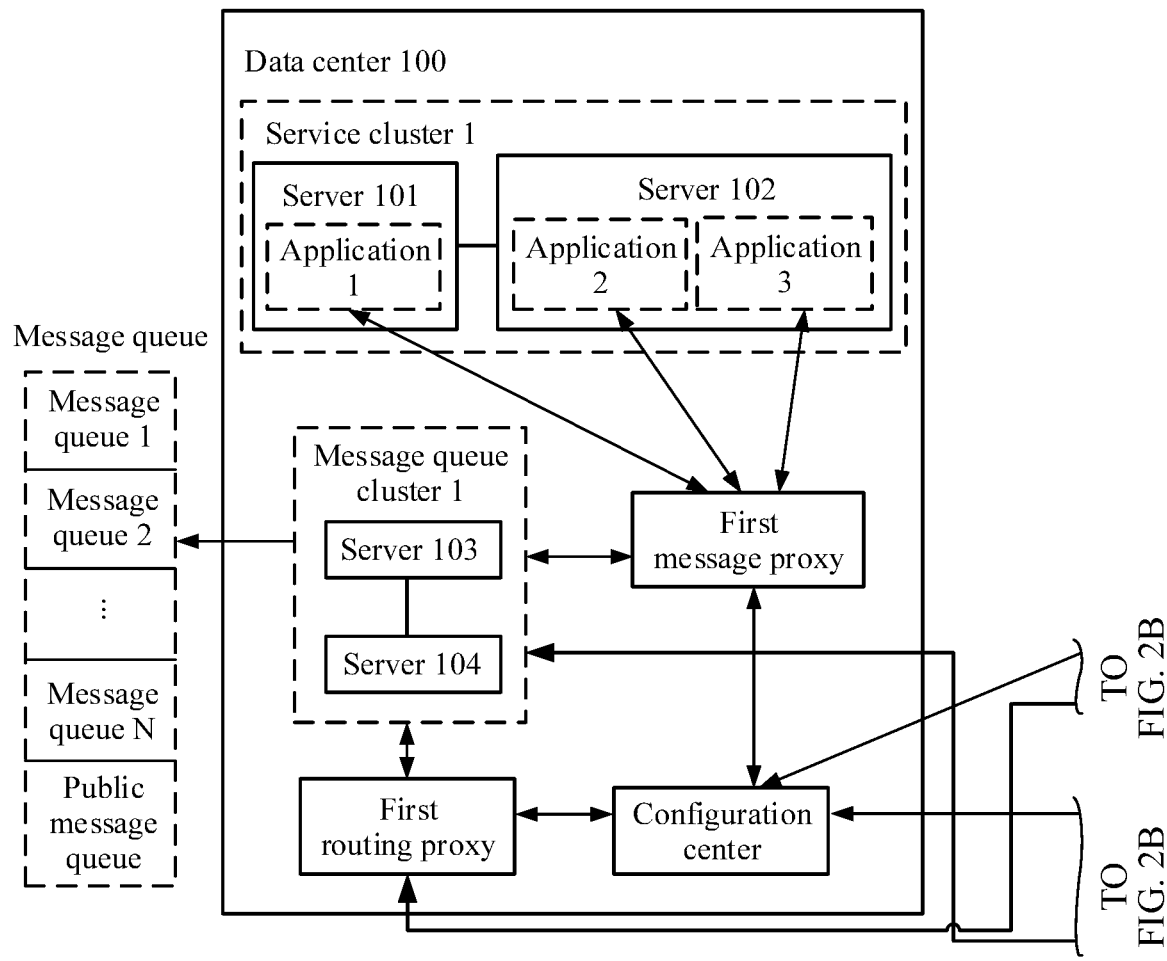
FIG. 2A and FIG. 2B are a schematic diagram of an architecture of a system based on message queue cluster communication according to this disclosure.
Figure 2B:
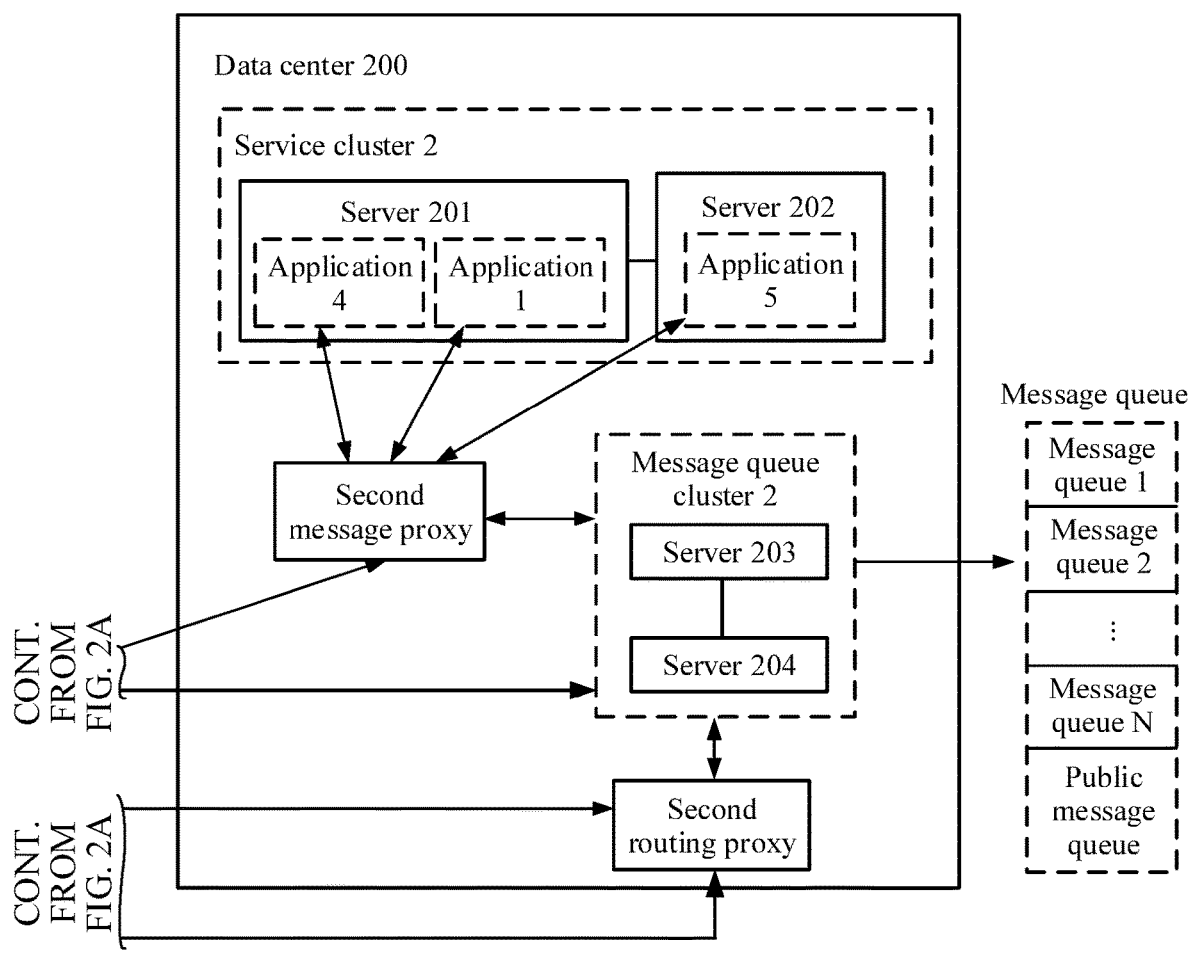

FIG. 2A and FIG. 2B are a schematic diagram of an architecture of a system based on message queue cluster communication according to an embodiment of this disclosure. A message proxy (MP) and a routing proxy (RP) are added to the system based on message queue cluster communication. The message proxy may be deployed on an independent server, and is configured to receive a message from an application and determine routing information. The routing proxy may be deployed on an independent server, and is configured to send a message processed by another data center to a target data center. The message proxy and the routing proxy may alternatively be deployed on a same server. A message proxy and a routing proxy are configured in each data center. The message proxy is in a one-to-one correspondence with a message queue cluster. That is, one message queue cluster corresponds to one message proxy. The routing proxy is in a one-to-one correspondence with a local message queue cluster, and is in a one-to-many correspondence with remote message queue clusters. That is, each local message queue cluster corresponds to one routing proxy, and each routing proxy corresponds to a plurality of remote message queue clusters. A difference between FIG. 2 (including FIG. 2A and FIG. 2B) and FIG. 1 lies in that one message proxy and one routing proxy are added to each data center in FIG. 2 (including FIG. 2A and FIG. 2B). For example, a data center 1 includes a first message proxy and a first routing proxy. A data center 2 includes a second message proxy and a second routing proxy. The difference between FIG. 2 (including FIG. 2A and FIG. 2B) and FIG. 1 further lies in that a public message queue is added to the message queue cluster, and is used to store a message that needs to be processed by a message queue cluster of another data center.

Optionally, a configuration center that records configuration information is added in FIG. 2A. The configuration center may be deployed in any data center, and the message proxy and the routing proxy of each data center separately communicate with the configuration center such that the message proxy and the routing proxy obtain and update the configuration information. The configuration center, the message proxy, and the routing proxy may be separately deployed on different servers.

Figure 3A:
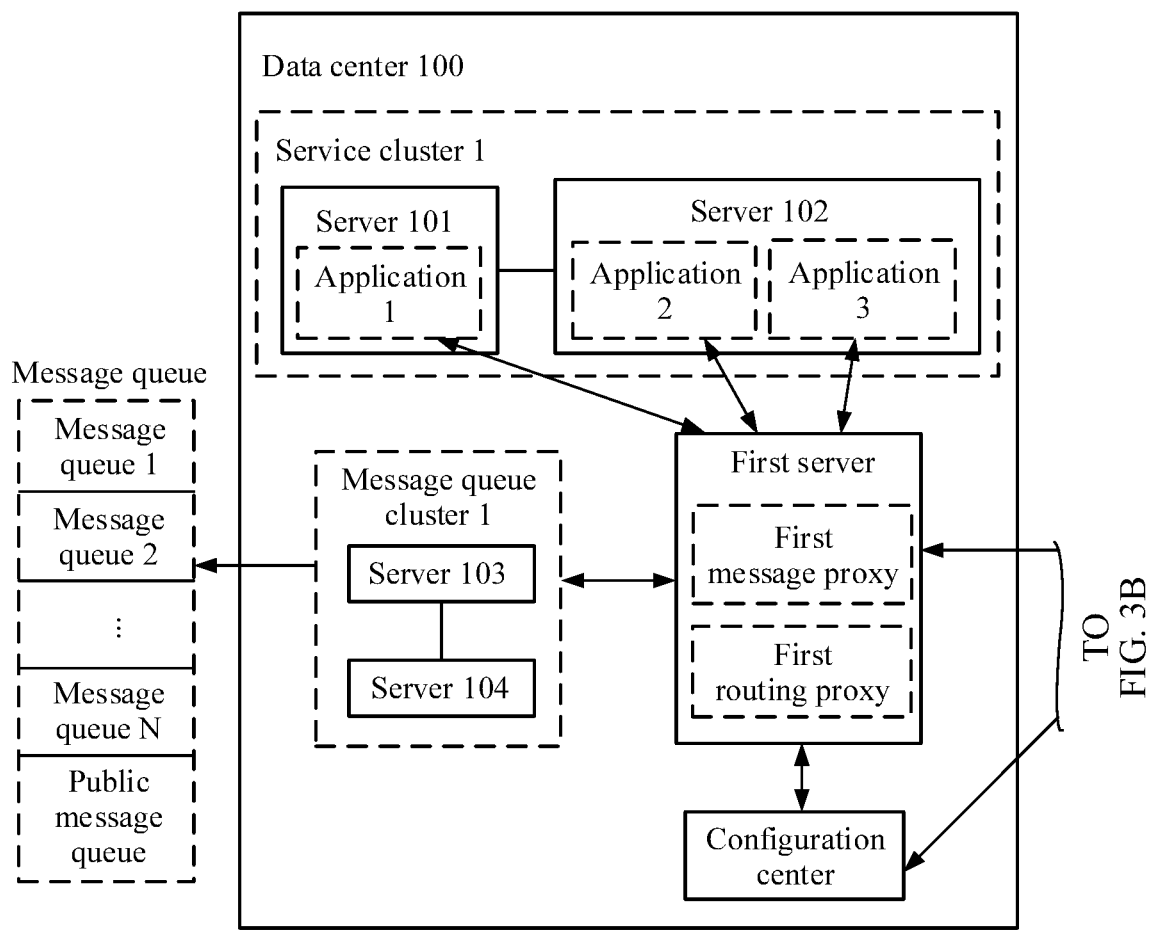
FIG. 3A and FIG. 3B are a schematic diagram of an architecture of another system based on message queue cluster communication according to this disclosure.
Figure 3B:
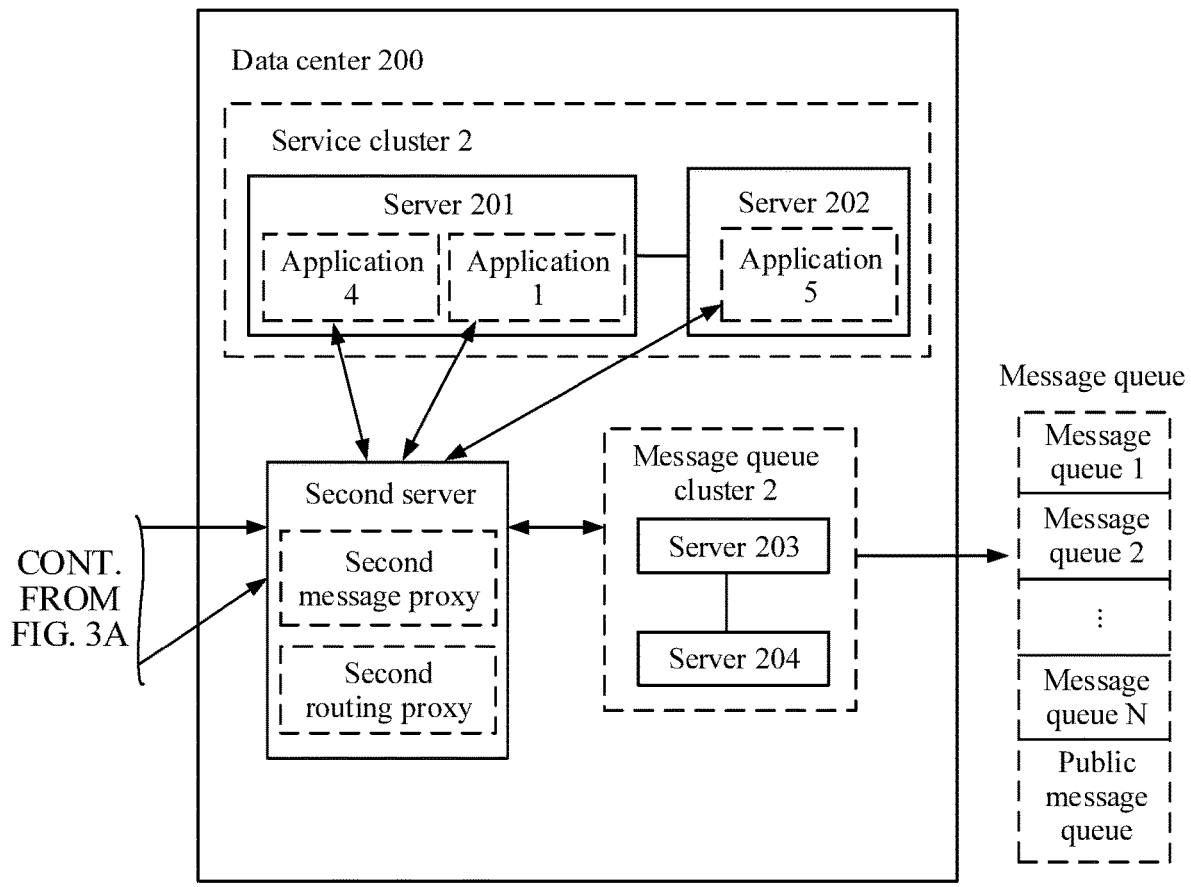

In a possible embodiment, FIG. 3A and FIG. 3B are a schematic diagram of another system architecture according to an embodiment of this disclosure. A configuration center, a message proxy, and a routing proxy may be proxies (agent) added to a server, and each proxy essentially is a software module. Alternatively, the proxies may be made into coprocessors, and the coprocessors are installed on different servers. In this case, a first message proxy and a first routing proxy may be installed on one server, and the configuration center is installed on another server. Optionally, the configuration center, the message proxy, and the routing proxy may alternatively be deployed on a same server.

Optionally, in addition to recording the configuration information using the configuration centers in the systems shown in FIG. 2 (including FIG. 2A and FIG. 2B) and FIG. 3 (including FIG. 3A and FIG. 3B), a third-party server may obtain and record the correspondence among the identifiers of the message queues in different data centers, the identifier of the application that sends the first message, and the identifier of the application that processes the second message. The third-party server does not belong to any data center, but can communicate with any server in the data center. Alternatively, any server in a data center obtains and records the correspondence among the identifiers of the message queues in different data centers, the identifier of the application that sends the first message, and the identifier of the application that processes the second message, and the server may communicate with a server in each data center.

It should be understood that quantities of the data centers in the systems shown in FIG. 2 (including FIG. 2A and FIG. 2B) and FIG. 3 (including FIG. 3A and FIG. 3B), a quantity of the servers in the service cluster of each data center, and a quantity of the applications deployed on each server each do not constitute a limitation on this disclosure. In the following descriptions of this disclosure, that the system includes two data centers and each data center includes one service cluster and one message queue cluster is merely used as an example for description. For ease of subsequent description, the system shown in FIG. 2 (including FIG. 2A and FIG. 2B) is used as an example for description in the following descriptions of the embodiments of this disclosure.

Figure 4:
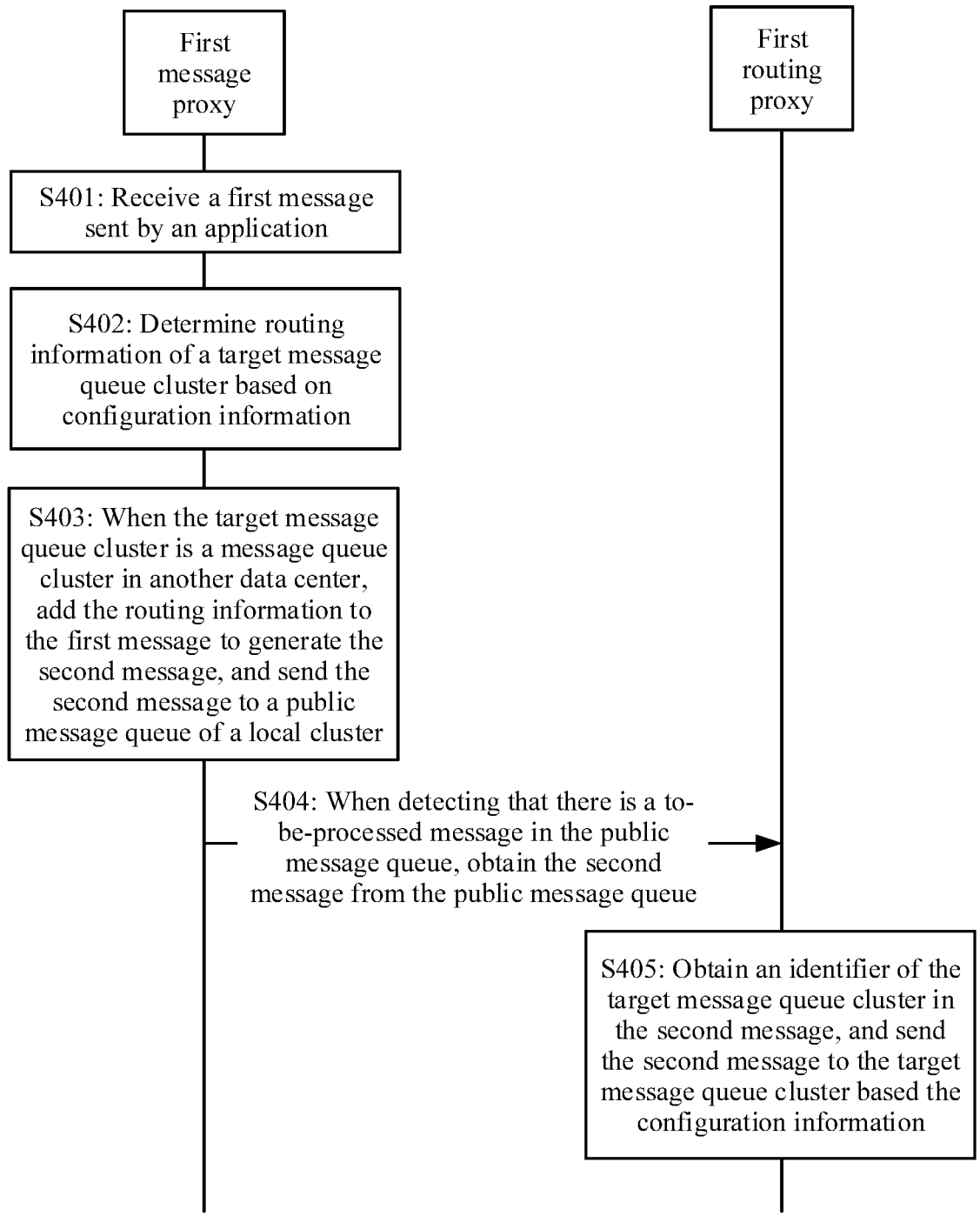
FIG. 4 is a schematic flowchart of a method based on message queue cluster communication according to this disclosure.

FIG. 4 is a schematic flowchart of a method based on message queue cluster communication according to an embodiment of this disclosure. As shown in FIG. 4, the method includes the following steps.

S401: The first message proxy receives a first message sent by at least one application.

As shown in FIG. 2A, the first message proxy is a message proxy that receives an application message and that is in the data center 100. In this embodiment of this disclosure, an application in the data center 100 does not directly communicate with a message queue cluster, but sends all messages to the first message proxy, and the first message proxy stores the messages in a message queue of the message queue cluster. The first message is a message sent by the at least one application.

Optionally, the first message may carry an application identifier (identification).

When a same data center includes a plurality of message queue clusters, at least one message proxy is configured for each message queue cluster. The application may establish an association relationship with one message proxy according to a service requirement, and all the messages of the application are processed by the message proxy that has the association relationship with the application.

S402: The first message proxy determines routing information of a target message queue cluster based on configuration information.

Further, the routing information of the target message queue cluster is used to identify a predetermined communication transit between applications. The first message proxy may determine the routing information based on a relationship between a producer and a consumer in the configuration information. Configuration information preset by the configuration center includes the correspondence among the identifiers of the message queues in different data centers, the identifier of the application that sends the first message, and the identifier of the application that processes the second message. The configuration information may be preconfigured by maintenance personnel based on the service requirement using an interface (for example, an application programming interface (API)).

For example, Table 1 is an example of the configuration information. As shown in the table, the configuration information records the identifiers of the message queues in different data centers associated with each application. Each application performs a function in a message transmission process. For example, assuming that the application 1 sends the first message, and the application 2, the application 3, the application 4, and the application 5 need to receive and process the first message, the application 1 is a producer, and the application 2, the application 3, the application 4, and the application 5 are consumers.

TABLE 1

An example of the configuration information

| Message queue name | | Application | Type | Identifier of a message queue cluster |
|---|---|---|---|---|
| Data center 1 | Message queue 1 | Application 1 | Producer | Message queue cluster 1 |
| Data center 1 | Message queue 1 | Application 2 | Consumer | Message queue cluster 1 |
| Data center 1 | Message queue 1 | Application 3 | Consumer | Message queue cluster 1 |
| Data center 2 | Message queue 1 | Application 4 | Consumer | Message queue cluster 2 |
| Data center 2 | Message queue 1 | Application 5 | Consumer | Message queue cluster 2 |
| Data center 1 | Message queue 2 | Application 1 | Consumer | Message queue cluster 1 |
| Data center 1 | Message queue 2 | Application 2 | Producer | Message queue cluster 1 |
| Data center 2 | Message queue 2 | Application 4 | Consumer | Message queue cluster 2 |

Optionally, the identifier of the message queue cluster in the table 1 may alternatively be an IP address of a management server in the message queue cluster.

The configuration information can be configured by the maintenance personnel according to a preset rule. Further, the preset rule may be any one of the following rules.

Rule 1: Bind one or more applications to one message queue based on types of the applications.

For example, as shown in the table 1, a message that the type of the application 1 is a producer is stored in the message queue 1. A message that the type of the application 2 is a producer is stored in the message queue 2. In this case, if the first message proxy receives a message sent by the application 1, the first message proxy stores the message in the message queue 1 of the message queue cluster 1. If the first message proxy receives a message sent by the application 2, the first message proxy stores the message in the message queue 2 of the message queue cluster 1.

It should be noted that a producer-type application in the configuration information indicates that the application is an application that sends a message, and a consumer-type application indicates that the application is an application that processes the message. A same application that serves as a producer may correspond to one or more applications that serve as consumers.

Optionally, the configuration information may further include a configuration group. When a plurality of applications are simultaneously bound to one message queue or there are a plurality of applications that serve as producers, it may be understood that the configuration information shown in the table 1 includes a plurality of configuration groups, and each configuration group includes information about a corresponding consumer-type application when one application is of a producer type.

For example, Table 2 is another example of the configuration information. Table 2 shows an example in which different configuration groups are configured when each application is used as a producer. For example, a configuration when the application 1 is a producer is defined as a configuration group 1, and a configuration when the application 2 is a producer is defined as a configuration group 2.

TABLE 2

An example of the configuration information

| Configuration group | Message queue name | | Application | Type | Identifier of a message queue cluster |
|---|---|---|---|---|---|
| Configuration group 1 | Data center 1 | Message queue 1 | Application 1 | Producer | Message queue cluster 1 |
| | Data center 1 | Message queue 1 | Application 2 | Consumer | Message queue cluster 1 |
| | Data center 1 | Message queue 1 | Application 3 | Consumer | Message queue cluster 1 |
| | Data center 2 | Message queue 1 | Application 4 | Consumer | Message queue cluster 2 |
| | Data center 2 | Message queue 1 | Application 5 | Consumer | Message queue cluster 2 |
| Configuration group 2 | Data center 1 | Message queue 2 | Application 1 | Consumer | Message queue cluster 1 |
| | Data center 1 | Message queue 2 | Application 2 | Producer | Message queue cluster 1 |
| | Data center 2 | Message queue 2 | Application 4 | Consumer | Message queue cluster 2 |

Rule 2: Bind one or more applications to one message queue based on service priorities of the applications.

For example, a message sent by a high-priority application is stored in one or more queues, and a message sent by a low-priority application is stored in another queue. Different types are then differentiated in each queue.

In an initialization phase, the first message proxy obtains the configuration information from the configuration center, and stores the configuration information in a storage space of the first message proxy, for example, stores the configuration information in a memory of a server on which first message proxy is located. When the correspondence among the identifiers of the message queues in different data centers, the identifier of the application that sends the first message, and the identifier of the application that processes the second message in the system changes, the configuration center may actively notify the first message proxy that the configuration information is updated, and the first message proxy obtains the updated configuration information, and stores the updated configuration information in a storage device (for example, the memory) of the server on which the first message proxy is located. Optionally, the first message proxy may also determine, by periodic monitoring, whether the configuration information is updated. When the correspondence among the identifiers of the message queues in different data centers, the identifier of the application that sends the first message, and the identifier of the application that processes the second message in the system changes, the first message proxy actively obtains the updated configuration information, and stores the updated configuration information in the storage device of the server on which the first message proxy is located.

Similar to the first message proxy, in the initialization phase, the first routing proxy obtains the configuration information from the configuration center, and stores the configuration information in a storage space of the first routing proxy, for example, stores the configuration information in a storage device (for example, a memory) of a server on which the first routing proxy is located. When the correspondence among the identifiers of the message queues in different data centers, the identifier of the application that sends the first message, and the identifier of the application that processes the second message in the system changes, the configuration center may actively notify the first routing proxy that the configuration information is updated, and the first routing proxy obtains the updated configuration information, and stores the updated configuration information in the storage device of the server on which the first routing proxy is located. Optionally, the first routing proxy may also determine, by periodic monitoring, whether the configuration information is updated. When the correspondence among the identifiers of the message queues in different data centers, the identifier of the application that sends the first message, and the identifier of the application that processes the second message in the system changes, the first routing proxy actively obtains the updated configuration information, and stores the updated configuration information in the memory of the server on which the first routing proxy is located.

Optionally, when the configuration information is stored in a third-party server or any server in the data center, the first message proxy and the first routing proxy obtain the configuration information in the initialization phase, and obtain the updated configuration information again when the configuration information is updated.

Further, the first message proxy may determine the routing information of the target message queue cluster based on the configuration information. Further, the application identifier carried in the first message is compared with the configuration information to separately determine the applications that serve as consumers and message queue clusters that match the applications that serve as consumers. For example, according to the configuration information shown in the table 1, the application 1 and the application 2 negotiate in advance to communicate with each other using the message queue 1 of the message queue cluster 1. When receiving a message sent by the application 1, the first message proxy may store the first message in the message queue 1 of the message queue cluster 1 of the data center 1. When a consumer of an application is in another data center and needs to use a remote message queue cluster as a transit, the message proxy may further determine an identifier of the target message queue cluster. For example, as shown in the table 1, the first message proxy determines that the applications that receive the message may be the application 2, the application 3, the application 4, and the application 5. When the application 1 communicates with the application 2 and the application 3, message interaction may be performed using the message queue cluster 1 of the data center 1 as a transit. When the application 1 communicates with the application 4 and the application 5, message interaction may be performed using the message queue cluster 2 of the data center 2 as a transit. In this case, the identifier of the target message queue cluster is the message queue cluster 2 of the data center 2. A process in which the first message proxy stores the first message in the message queue 1 includes that a first message queue sends the first message to a management server of the target message queue cluster, and the management server determines, based on a correspondence between an identifier of an application in the first message and a message queue, that a target message queue is the message queue 1, and stores the first message in the message queue 1.

In a possible embodiment, the first message may also carry an identifier of the target message queue. The application stores a correspondence between the application and the message queue. When receiving the first message, the first message proxy may determine a consumer based on message configuration information, and send the message to the target message queue in the target message queue cluster.

S403: When the target message queue cluster is a message queue cluster in another data center, the first message proxy adds the identifier of the target message queue cluster to the first message to generate the second message, and stores the second message in a public message queue of a local cluster.

A same message queue cluster (namely, the target message queue cluster) that is negotiated in advance needs to be used as a transit for communication between two applications. That the first message proxy determines routing information of the first message includes any one of the following three cases.

Case 1: When the target message queue cluster and the application that sends the first message are in a same data center, the target message queue cluster may also be referred to as a local message queue cluster, and the first message is stored in a message queue of the local message queue cluster. The message queue cluster directly sends a to-be-processed message to a consumer-type application of this message. Further, a queue manager in the message queue cluster may monitor a status of a to-be-processed message in each message queue. In this case, a message queue management server stores configuration information. When it is detected that there is a to-be-processed message in the message queue, the message may be sent, based on the configuration information, to an application that serves as a consumer. Optionally, each application may further directly monitor a message queue in a local message queue cluster that matches the application, and when detecting that there is a new to-be-processed message in the message queue, the application obtains and processes this message. In a process in which a consumer of the foregoing message obtains the message, there is no cross-data center processing process of a remote message queue cluster during inter-application communication.

Case 2: When the target message queue cluster is a message queue cluster in another data center, the first message proxy determines the identifier of the target message queue cluster based on the configuration information. In this case, the target message queue cluster may also be referred to as a remote message queue cluster. The first message proxy adds the identifier of the target message queue cluster to the first message, to generate the second message. The identifier of the target message queue cluster includes an IP address of the target message queue cluster, and further includes an IP address of the management server of the target message queue cluster. Optionally, the identifier of the target message queue cluster may further include an identifier (identification) of the public message queue. Then, the first message proxy stores the second message in the public message queue. The public message queue is a new queue type in this embodiment of this disclosure, and is mainly used to store a message that the message queue cluster in another data center needs to be used as a transit. The message in the public message queue is stored in a storage space of a server (or a storage server) in the message queue cluster, and the storage space may also be referred to as a public area of the storage server in the message queue cluster. The storage space may be a memory or a hard disk of the server. The public message queue is also a logical concept. The public message queue includes at least one unit, and each unit corresponds to a segment of the storage space of the server in the message queue cluster. The segment of the storage space may be a continuous storage area, or may be a discontinuous storage area. Different units may be connected using address pointers. To be specific, a current unit carries an address pointer, and this address pointer is used to indicate a start position of a storage space of a next unit in the public message queue. In addition, the public message queue may store messages in a first input first output (FIFO) manner, that is, according to a time sequence. A message received for the first time is first stored in a unit of a queue header of the public message queue, and messages received later are stored in the public message queue according to a receiving sequence. The routing proxy may also sequentially take away, in the FIFO manner, the message stored in each unit of the public message queue. When the message is stored in one unit of the public message queue, the unit may continue to store a new message, that is, resources of the public message queue may also be used repeatedly.

Case 3: When the target message queue cluster includes a message queue cluster that belongs to a same data center as an application, and further includes a message queue cluster in another data center, after determining the routing information, the first message proxy stores the first message in a target message queue in the local message queue cluster in the manner of the case 1. Then, the first message proxy copies the first message, adds the routing information (indicating the identifier of the remote message queue cluster) to the copied first message to generate the second message, and then stores the second message in the public message queue.

It should be noted that, in the case 3, there is no sequence requirement for a process in which the first message queue stores the first message in a local queue in the local message queue, generates the second message, and stores the second message in the public message queue. The first message may be first stored in the local queue in the local message queue cluster, and then the second message is generated and stored in the public message queue. Alternatively, the second message may be first generated and stored in the public message queue, and then the first message is stored in the local queue in the local message queue cluster.

S404: When detecting that there is a to-be-processed message in the public message queue, the first routing proxy obtains the second message from the public message queue.

The first routing proxy may learn, by communicating with the message queue cluster, whether there is a to-be-processed message in the public message queue, and may communicate with the message queue cluster using a manager of the message queue cluster.

The first routing proxy may monitor the public message queue in any one of the following manners.

Manner 1: The first routing proxy periodically monitors a status of the public message queue.

Manner 2: When there is a to-be-processed message in the public message queue, the message queue cluster notifies the first routing proxy.

S405: The first routing proxy obtains the identifier of the target message queue cluster in the second message, and sends the second message to another data center based on the routing information.

Further, the first routing proxy sends the second message to a target message queue cluster in another data center based on the routing information. A queue manager of the target message queue cluster may continue to store the second message in a specified message queue. Further, a queue management server of the target message queue cluster determines a target message queue based on the application identifier and the configuration information that are carried in the second message, and stores the second message in the target message queue. Then, the queue manager sends, based on the configuration information, the second message to an application that serves as a consumer.

Because message proxies in different data centers obtain same configuration information, correspondences among message queues, applications, consumers, and producers are the same. That is, in the system shown in FIG. 2 (including FIG. 2A and FIG. 2B), quantities and identifiers of the message queues in the message queue cluster 1 in the data center 100 are the same as quantities and identifiers of the message queues in the message queue cluster 2 in the data center 200, and a binding relationship between each message queue and an application is also the same. The queue management server of the target message queue cluster may also store the configuration information. When the target message queue cluster receives the second message, the queue management server of the target message queue cluster may directly store the second message into the specified message queue according to a correspondence. Then, the queue management server sequentially sends the second messages to consumer-type applications one by one based on types recorded in the configuration information.

Optionally, the second message may further carry an identifier of the target message queue. The queue manager of the target message queue cluster may directly store the second message in the target message queue based on the identifier of the target message queue.

It should be noted that a process of storing a message in a message queue cluster may be implemented by controlling message storage by a queue management server in the message queue cluster, and this is not limited in the present embodiment.

In a message transmission manner based on a message queue cluster, a message sent by a producer does not carry a consumer identifier. That is, a destination end of message transmission is a consumer recorded in the configuration information. For example, in the configuration information shown in the table 1, when the application 1 sends a message, the message is transmitted to the application 2, the application 3, the application 4, and the application 5. When the application 2 sends a message, the message is transmitted to the application 1 and the application 4. Optionally, a message sent by an application may also carry an identifier of a target application. In this case, the message proxy only needs to determine, based on the configuration information, an identifier of a message queue cluster for communication between the application that sends the message and a destination end application. When the message queue cluster is a remote message queue cluster, operations are performed according to the steps S403 to S405.

In the following, the system shown in FIG. 2 (including FIG. 2A and FIG. 2B) and the configuration information shown in the table 1 are used as an example to fully describe the method based on message queue cluster communication provided in this embodiment of this disclosure. When the application 1 needs to communicate with another application using a message 1, the message 1 is received by the first message proxy. The first message proxy determines, based on the configuration information shown in the table 1, that consumers are the application 2, the application 3, the application 4, and the application 5. The application 1 belongs to a same data center as the application 2 and the application 3, and may directly use the message queue cluster 1 as a transit for communication. The data center to which the application 1 belongs is different from a data center to which the application 4 and the application 5 belong, and the application 1 needs to use the message queue cluster 2 as a transit to communicate with the application 4 and the application 5. The first message proxy first stores the message 1 in the message queue 1 of the message queue cluster 1 based on the configuration information. In this case, the message queue cluster 1 (a queue manager of the message queue manager 1) may send the message 1 to the application 2 and the application 3, or the application 2 and the application 3 directly obtain a message 2 when detecting that there is a to-be-processed message in the message queue 1. For communication between the application 1 and the application 4 and between the application 1 and the application 5, the first message proxy needs to determine an identifier of a target message queue cluster, namely, an ID or an IP address of the message queue cluster 2, based on the configuration information, then copies the message 1, adds the identifier of the message queue cluster 2 to the copied message 1, to generate the message 2, stores the message 2 into a public message queue, and then sends the message 2 to the message queue cluster 2 (a queue manager of the message queue cluster 2). The message queue cluster 2 (the queue manager of the message queue cluster 2) sends the message 2 to the application 4 and the application 5, to complete the communication between the application 1 and the application 4 and between the application 1 and the application 5.

According to the foregoing description, in the technical solution provided in this embodiment of this disclosure, a message proxy and a routing proxy are added to each data center such that an application directly communicates with the message proxy, and the message proxy determines routing information of a target message queue cluster based on preset configuration information. When the target message queue cluster is a remote message queue cluster, the message proxy copies the message, and adds the identifier of the target message queue cluster to the copied message. Finally, the routing proxy sends the message to the target message queue cluster. In this technical solution, the application does not need to determine routing information carried in the message, the message proxy determines the routing information, and the routing proxy forwards the message to the target message queue cluster. A communication process in which a local message queue cluster sends a message, the local message queue cluster receives a message, and a consumer determines a route is implemented, and this resolves a problem of a complex route selection processing process of an application in a conventional technical solution, improves inter-application communication efficiency, and reduces application communication time. In addition, in this embodiment of this disclosure, the message proxy and the routing proxy complete a process of confirming and forwarding routing information of an application message, without participation of an application, and there is no need to add configuration information to the application. This avoids "intrusion" of application code, and improves application security. Further, when a message queue cluster used for communication between different applications changes, routing configuration information in the applications does not need to be changed. This reduces operation and maintenance complexity and processing duration, and improves operation and maintenance efficiency.

In a possible embodiment, the method based on message queue cluster communication provided in this disclosure is also applicable to a distributed application deployment scenario. Further, as shown in FIG. 2A and FIG. 2B, the application 1 is deployed in a distributed mode, and is separately deployed in the service cluster 1 of the data center 100 and in the service cluster 2 of the data center 200. It is assumed that the application is deployed in an active/standby mode, and only one application in an active state works at a same time. When the application 1 in the data center 100 is an application in an active state, and the application 1 needs to communicate with the application 2 in a same data center, a message sent by the application 1 may be received using the first message proxy. The first message proxy determines, based on preset configuration information, to store the message in the message queue 2 of the message queue cluster 1, and the application 2 serves as a consumer to receive the message, to complete communication between the application 1 and the application 2. When the application 1 in the data center 200 is an application in an active state, and the application 1 needs to communicate with the application 2 in a different data center, the second message proxy receives a message sent by the application 1, adds an identifier of a target message queue cluster to the message, that is, adds an identifier of the message queue cluster 1 to the message, to generate a second message, and stores the second message in a public message queue of the message queue cluster 2. The second routing proxy sends the second message to the message queue cluster 1 (a queue manager of the message queue cluster 1), and then the queue manager of the message queue cluster 1 sends the second message to the application 2, to complete the communication between the application 1 and the application 2.

According to the foregoing description, in an application dynamic deployment scenario, a routing rule may be dynamically adjusted. To change a location of an application in an active state, routing configuration information does not need to be changed, and "intrusion" of application code is avoided. This resolves a problem of difficult and insecure operation and maintenance in a conventional technical solution, and improves system communication efficiency.

It should be noted that, for brief description, the foregoing method embodiments are described as a combination of a series of actions. However, a person skilled in the art should know that the present embodiment is not limited to the described sequence of actions.

The foregoing describes in detail the communications system and the method according to the embodiments of this disclosure with reference to FIG. 1 to FIG. 4. The following describes a communications apparatus according to the embodiments of this disclosure with reference to FIG. 5 to FIG. 7.

Figure 5:
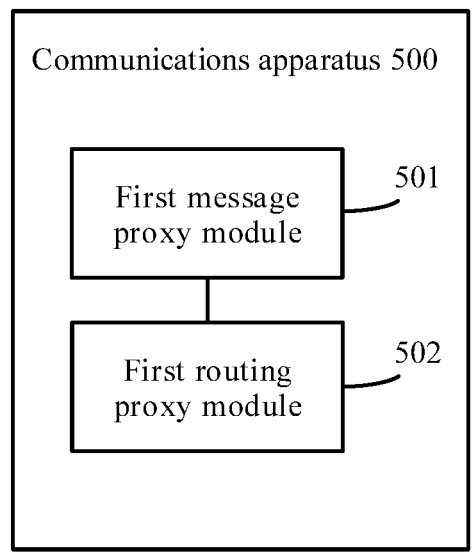
FIG. 5 is a schematic diagram of a structure of a communications apparatus according to an embodiment of this disclosure.

FIG. 5 is a schematic diagram of a structure of a communications apparatus 500 according to an embodiment of this disclosure. As shown in the figure, the communications apparatus 500 is applied to a communications system. The communications system includes at least a first data center and a second data center. The first data center includes a storage server, a first message proxy module 501, a first routing proxy module 502, a service server, and a storage server. An application runs on the service server, and the storage server is configured to store a message sent by the application on the service server.

The first message proxy module 501 is configured to receive a first message sent by the application running on the service server, add routing information to the first message to generate a second message when determining that the first message is a message processed by the second data center, and store the second message in a public area of the storage server, where the first storage server includes a private area and the public area, the private area is used to store a message processed by the first data center, and the public area is used to store a message processed by the second data center.

The first routing proxy module 502 is configured to obtain the second message from the public area, and send the second message to the second data center based on the routing information.

Optionally, the public area of the storage server includes a first message queue, the private area includes a second message queue. In this case, that the first message proxy module 501 stores the second message in the public area of the storage server includes storing the second message in the second message queue.

Optionally, the first message proxy module 501 is further configured to before adding the routing information to the first message to generate the second message, determine the routing information based on configuration information, where the configuration information includes a correspondence among identifiers of message queues in different data centers, an identifier of the application that sends the first message, and an identifier of an application that processes the second message.

Optionally, the communications system further includes a configuration center. The configuration center is configured to store the configuration information.

The first message proxy module 501 is further configured to before receiving the first message sent by the application running on the service server, obtain the configuration information from the configuration center.

The first routing proxy module 502 is further configured to before obtaining the second message from the public area, obtain the configuration information from the configuration center.

Optionally, the second data center includes a management server, the management server is configured to manage a storage server in the second data center, and the routing information includes an IP address of the management server. Therefore, that the first routing proxy module 502 sends the second message to another data center based on the routing information includes sending the second message to the management server based on the IP address of the management server such that the management server stores the second message in the storage server in the second data center.

It should be understood that the communications apparatus 500 in this embodiment of this disclosure corresponds to a scenario in which the first message proxy and the second message proxy in the communications system architecture shown in FIG. 2A and FIG. 2B are separately implemented by different servers. The communications apparatus 500 in this embodiment of this disclosure may be implemented using an application-specific integrated circuit (ASIC), or may be implemented using a programmable logic device (PLD). The PLD may be a complex PLD (CPLD), a field-programmable gate array (FPGA), generic array logic (GAL), or any combination thereof. Alternatively, when the communication methods shown in FIG. 2 (including FIG. 2A and FIG. 2B) and FIG. 3 (including FIG. 3A and FIG. 3B) may be implemented using software, the communications apparatus 500 and the modules thereof may be software modules.

The communications apparatus 500 in this embodiment of this disclosure may correspondingly perform the methods described in the embodiments of this disclosure. In addition, the foregoing and other operations and/or functions of the units in the communications apparatus 500 are separately used to implement a corresponding procedure of the methods in FIG. 2 (including FIG. 2A and FIG. 2B) and FIG. 3 (including FIG. 3A and FIG. 3B). For brevity, details are not described herein again.

Figure 6:
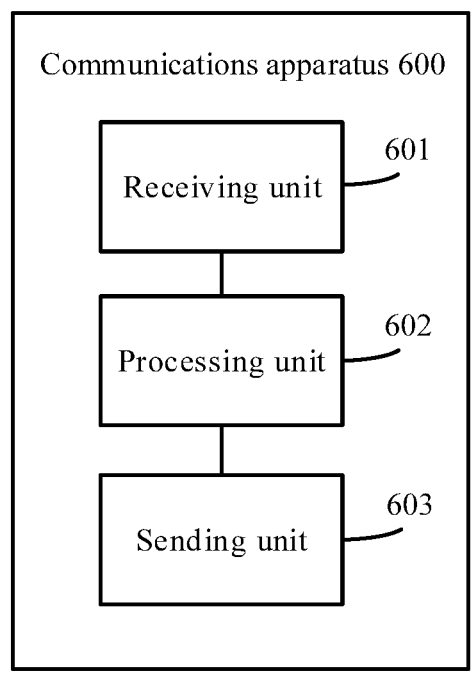
FIG. 6 is a schematic diagram of a structure of an apparatus based on message queue cluster communication according to this disclosure.

FIG. 6 is a schematic diagram of a structure of another communications apparatus 600 according to an embodiment of this disclosure. The communications apparatus 600 is applied to a communications system. The communications system includes at least a first data center and a second data center. The first data center includes a first server, a service server, and a storage server. An application runs on the service server, and the storage server is configured to store a message sent by the application on the service server. As shown in the figure, the communications apparatus 600 includes a receiving unit 601, a processing unit 602, and a sending unit 603.

The receiving unit 601 is configured to receive a first message sent by the application running on the service server.

The processing unit 602 is configured to when the first server determines that the first message is processed by the second data center, add routing information to the first message to generate a second message, and store the second message in a public area of the storage server. The storage server includes a private area and the public area, where the private area is used to store a message processed by the first data center, and the public area is used to store a message processed by the second data center.

The sending unit 603 is configured to obtain the second message from the public area, and send the second message to the second data center based on the routing information.

Optionally, the public area of the storage server includes a first message queue, the private area includes a second message queue. In this case, that the processing unit 602 stores the second message in the public area of the storage server includes storing the second message in the second message queue.

Optionally, that the processing unit 602 determines that the first message is processed by the second data center includes before adding the routing information to the first message to generate the second message, determining the routing information based on configuration information, where the configuration information includes a correspondence among identifiers of message queues in different data centers, an identifier of the application that sends the first message, and an identifier of an application that processes the second message.

Optionally, the communications system further includes a configuration center, and the configuration center is configured to store the configuration information. Before receiving the first message sent by the application running on the service server, the processing unit 602 is further configured to obtain the configuration information from the configuration center.

Optionally, the second data center includes a management server, the management server is configured to manage a storage server in the second data center, and the routing information includes an IP address of the management server. Therefore, that the sending unit 603 sends the second message to the second data center based on the routing information includes sending the second message to the management server based on the IP address of the management server such that the management server stores the second message in the storage server in the second data center.

It should be understood that the communications apparatus 600 in this embodiment of this disclosure corresponds to a scenario in which the first message proxy and the second message proxy in the communications system architecture shown in FIG. 3A and FIG. 3B are implemented by a same server. The communications apparatus 600 may be implemented using an ASIC, or may be implemented using a PLD. The PLD may be a CPLD, an FPGA, GAL, or any combination thereof. Alternatively, when the communication methods shown in FIG. 2 (including FIG. 2A and FIG. 2B) to FIG. 3 (including FIG. 3A and FIG. 3B) may be implemented using software, the communications apparatus 600 and the modules thereof may be software modules.

The communications apparatus 600 in this embodiment of this disclosure may correspondingly perform the methods described in the embodiments of this disclosure. In addition, the foregoing and other operations and/or functions of the units in the communications apparatus 600 are separately used to implement a corresponding procedure of the methods in FIG. 2 (including FIG. 2A and FIG. 2B) and FIG. 3 (including FIG. 3A and FIG. 3B). For brevity, details are not described herein again.

Figure 7:
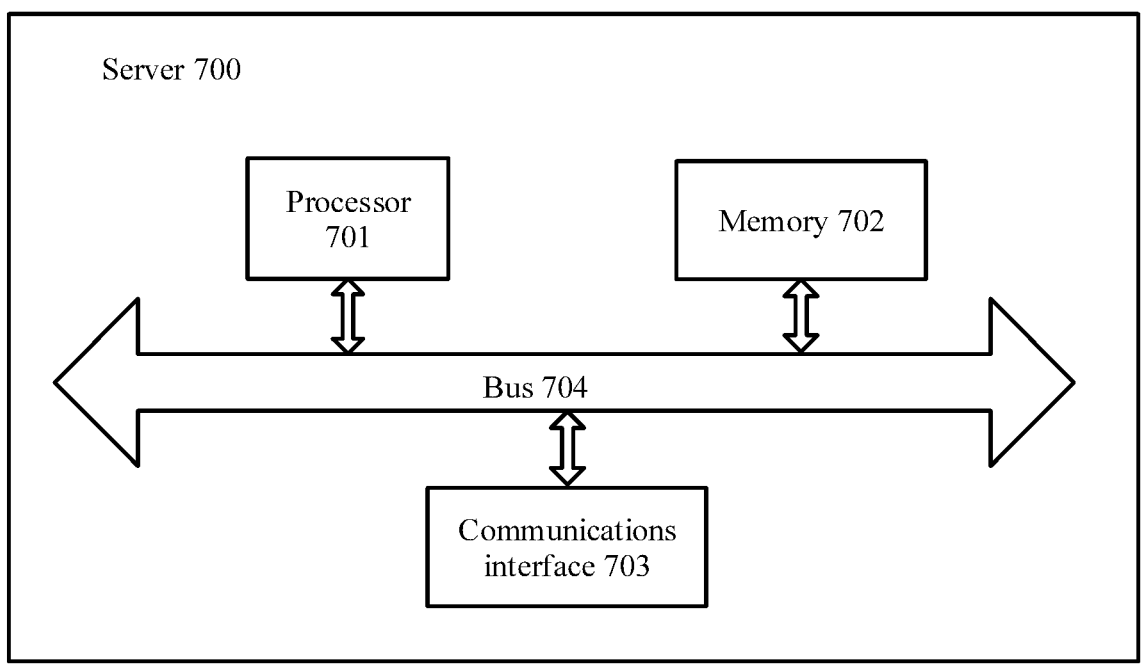
FIG. 7 is a schematic diagram of a structure of a server according to this disclosure.

FIG. 7 is a schematic diagram of a server 700 according to an embodiment of this disclosure. As shown in the figure, the server 700 includes a processor 701, a memory 702, a communications interface 703, a bus 704, and a storage device 705. The processor 701, the memory 702, the communications interface 703, and the storage device 705 communicate with each other using the bus 704, or may communicate with each other in another manner such as wireless transmission. The memory 702 is configured to store an instruction. The processor 701 is configured to execute the instruction stored in the memory 702. The memory 702 stores program code, and the processor 701 may invoke the program code stored in the memory 702 to receive a first message sent by an application running on a service server, when determining that the first message is processed by a second data center, add routing information to the first message to generate a second message, and store the second message in a public area of a storage server, where the storage server includes a private area and the public area, the private area is used to store a message processed by a first data center, and the public area is used to store a message processed by the second data center, and obtain the second message from the public area, and send the second message to the second data center based on the routing information.

Optionally, the public area of the storage server includes a first message queue, the private area includes a second message queue. In this case, that the processor 701 stores the second message in the public area of the storage server includes storing the second message in any one of the first message queue in the second message queue.

Optionally, that the processor 701 determines that the first message is processed by the second data center includes before adding the routing information to the first message to generate the second message, determining the routing information based on configuration information, where the configuration information includes a correspondence among identifiers of message queues in different data centers, an identifier of the application that sends the first message, and an identifier of an application that processes the second message.

Optionally, the communications system further includes a configuration center, and the configuration center is configured to store the configuration information. Before receiving the first message sent by the application running on the service server, the processor 701 obtains the configuration information from the configuration center.

Optionally, the second data center includes a management server, the management server is configured to manage a storage server in the second data center, and the routing information includes an IP address of the management server.

Therefore, that the processor 701 sends the second message to the second data center based on the routing information includes sending the second message to the management server based on the IP address of the management server such that the management server stores the second message in the storage server in the second data center.

It should be understood that in this embodiment of this disclosure, the processor 701 may be a central processing unit (CPU), or the processor 701 may be another general purpose processor, a digital signal processor (DSP), an ASIC, an FPGA or another PLD, a discrete gate or a transistor logic device, a discrete hardware component, or the like. The general purpose processor may be a microprocessor, any conventional processor, or the like.

The memory 702 may include a read-only memory and a random access memory, and provide an instruction and data to the processor 701. The memory 702 may further include a nonvolatile random-access memory (RAM). For example, the memory 702 may further store information about a device type.

The memory 702 may be a volatile memory or a nonvolatile memory, or may include a volatile memory and a nonvolatile memory. The nonvolatile memory may be a read-only memory (ROM), a programmable ROM (PROM), an erasable PROM (EPROM), an electrically EPROM (EEPROM), or a flash memory. The volatile memory may be a RAM, used as an external cache. Through example but not limitative description, many forms of RAMs may be used, for example, a static RAM (SRAM), a dynamic RAM (DRAM), a synchronous DRAM (SDRAM), a double data rate (DDR) SDRAM, an enhanced SDRAM (ESDRAM), a synchronous link dynamic RAM (SLDRAM), and a direct rambus (DR) RAM.

The bus 704 may further include a power bus, a control bus, a status signal bus, and the like, in addition to a data bus. However, for clear description, various types of buses in the figure are marked as the bus 704.

It should be understood that the server 700 according to this embodiment of this disclosure may correspond to the communications apparatus 600 in the embodiments of this disclosure, and may correspond to a scenario in which the first message proxy and the first routing proxy in FIG. 3A in the embodiments of this disclosure are implemented by one server. In addition, the foregoing and other operations and/or functions of the modules in the server 700 are separately used to implement corresponding procedures of the method in FIG. 4. For brevity, details are not described herein again.

This embodiment of this disclosure further provides a first proxy server. A structure of the first proxy server is the same as that shown in FIG. 7, and corresponds to a first proxy server in the communications system shown in FIG. 2 (including FIG. 2A and FIG. 2B). In addition, the foregoing and other operations and/or functions of modules in the first proxy server are separately used to implement corresponding procedures performed by a first proxy server in the method in FIG. 4. For brevity, details are not described herein again.

This embodiment of this disclosure further provides a first routing server. A structure of the first routing server is the same as that shown in FIG. 7, and corresponds to a first routing server in the communications system shown in FIG. 2 (including FIG. 2A and FIG. 2B). In addition, the foregoing and other operations and/or functions of modules in the first routing server are separately used to implement corresponding procedures performed by a first routing server in the method in FIG. 4. For brevity, details are not described herein again.

This embodiment of this disclosure further provides a configuration center server. A structure of the configuration center server is the same as that shown in FIG. 7, and corresponds to the configuration centers in the communications systems shown in FIG. 2 (including FIG. 2A and FIG. 2B) and FIG. 3 (including FIG. 3A and FIG. 3B). In addition, the foregoing and other operations and/or functions of modules in the configuration center server are separately used to implement corresponding procedures performed by a configuration center server in the method in FIG. 4. For brevity, details are not described herein again.

According to the foregoing description, in the technical solution provided in this embodiment of this disclosure, a message proxy and a routing proxy are added to each data center such that an application directly communicates with the message proxy, and the message proxy determines routing information of a target message queue cluster based on preset configuration information. When the target message queue cluster is a remote message queue cluster, the message proxy adds an identifier of the target message queue cluster to a message. Finally, the routing proxy sends the message to the target message queue cluster. In this technical solution, the application does not need to determine routing information carried in the message, the message proxy determines the routing information, and the routing proxy forwards the message to the target message queue cluster. A communication process in which a local message queue cluster sends a message, the local message queue cluster receives a message, and a consumer determines a route is implemented, and this resolves a problem of a complex route selection processing of an application in a conventional technical solution, improves inter-application communication efficiency, and reduces an application communication time. In addition, in this embodiment of this disclosure, the message proxy and the routing proxy complete a process of confirming routing information of an application message, without participation of an application, and there is no need to add configuration information to the application. This avoids "intrusion" of application code, and improves application security. Further, when a message queue cluster used for communication between different applications changes, routing configuration information in the applications does not need to be changed. This reduces operation and maintenance complexity and duration, and improves operation and maintenance efficiency.

All or some of the foregoing embodiments may be implemented by means of software, hardware, firmware, or any combination thereof. When software is used to implement the embodiments, all or some of the foregoing embodiments may be implemented in a form of a computer program product. The computer program product includes one or more computer instructions. When the computer program instructions are loaded and executed on a computer, the procedures or functions according to the embodiments of this disclosure are all or partially generated. The computer may be a general-purpose computer, a special-purpose computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), or a semiconductor medium. The semiconductor medium may be a solid-state drive (SSD).

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each specific application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this disclosure, it should be understood that the disclosed system, apparatus, and method may be implemented in other manners. For example, the described apparatus embodiment is merely an example. For example, division into units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

The foregoing descriptions are merely specific implementations of the present embodiment. Any variation or replacement figured out by a person skilled in the art according to the specific implementations provided in the present embodiment shall fall within the protection scope of the present embodiment.

What is claimed is:

1. A communications system comprising:
a first data center comprising:
   a service server configured to run a first application;
   a first storage server comprising:
      a private area configured to store messages processed by the first data center; and
      a public area configured to store messages processed by data centers other than the first data center;
   a first message proxy coupled to the service server and the first storage server and configured to:
      receive a first message from the first application;
      determine that the first message is to be processed by a second data center;

add, in response to determining that the first message is to be processed by the second data center, routing information to the first message to generate a second message; and
store the second message in the public area; and
a first routing proxy coupled to the service server, the first storage server, and the first message proxy and configured to:
obtain the second message from the public area; and
send the second message to the second data center based on the routing information.

2. The communications system of claim 1, wherein the public area comprises a first message queue, wherein the private area comprises a second message queue, and wherein the first message proxy is further configured to store the second message in the second message queue.

3. The communications system of claim 1, wherein before adding the routing information to the first message, the first message proxy is further configured to determine the routing information based on configuration information, and wherein the configuration information comprises a correspondence among identifiers of message queues in different data centers, an identifier of the first application, and an identifier of a second application that processes the second message.

4. The communications system of claim 3, further comprising a configuration center configured to store the configuration information, wherein before receiving the first message, the first message proxy is further configured to obtain the configuration information from the configuration center, and wherein before obtaining the second message, the first routing proxy is further configured to obtain the configuration information from the configuration center.

5. The communications system of claim 3, further comprising a third-party server configured to obtain and record the configuration information.

6. The communications system of claim 5, wherein the third-party server does not belong to the first data center or the second data center.

7. The communications system of claim 1, wherein the second data center comprises a second storage server and a management server, wherein the management server is coupled to the second storage server and is configured to manage the second storage server, wherein the routing information comprises an Internet Protocol (IP) address of the management server, and wherein the first routing proxy is further configured to send the second message to the management server based on the IP address of the management server to enable the management server to store the second message in the second storage server.

8. A communication method implemented by a first server of a communications system, wherein the communications system comprises a first data center that comprises the first server, a first storage server, a first message proxy, and a first routing proxy, and wherein the communication method comprises:
receiving a first message from a first application;
determining that the first message is to be processed by a second data center;
adding, in response to determining that the first message is to be processed by the second data center, routing information to the first message to generate a second message;
storing the second message in a public area of the first storage server, wherein the first storage server comprises a private area and the public area, wherein the private area is configured to store messages processed by the first data center, and wherein the public area is configured to store messages processed by data centers other than the first data center; and
sending the second message to the second data center based on the routing information.

9. The communication method of claim 8, wherein the public area comprises a first message queue, wherein the private area comprises a second message queue, and wherein the communication method further comprises storing the second message in the second message queue.

10. The communication method of claim 8, further comprising determining, before adding the routing information to the first message, the routing information based on configuration information, wherein the configuration information comprises a correspondence among identifiers of message queues in different data centers, an identifier of the first application that sends the first message, and an identifier of a second application that processes the second message.

11. The communication method of claim 10, further comprising a configuration center configured to store the configuration information, wherein before receiving the first message, the communication method further comprises obtaining the configuration information from the configuration center.

12. The communications method of claim 11, further comprising recording the configuration information in a third-party server.

13. The communications method of claim 12, wherein the third-party server does not belong to the first data center or the second data center.

14. The communication method of claim 8, wherein the second data center comprises a management server configured to manage a second storage server in the second data center, wherein the routing information comprises an Internet Protocol (IP) address of the management server, and wherein the communication method further comprises sending the second message to the management server based on the IP address of the management server to enable the management server to store the second message in the second storage server.

15. A computer program product comprising computer-executable instructions for storage on a non-transitory computer-readable storage medium that, when executed by a processor, cause a first server of a first data center to:
receive a first message from a first application that runs on a service server;
determine that the first message is to be processed by a second data center;
add, in response to determining that the first message is to be processed by the second data center, routing information to the first message to generate a second message;
store the second message in a public area of a first storage server, wherein the first storage server comprises a private area and the public area, wherein the private area is configured to store messages processed by the first data center, and wherein the public area is configured to store messages processed by data centers other than the first data center;
obtain the second message from the public area; and
send the second message to the second data center based on the routing information.

16. The computer program product of claim 15, wherein the public area comprises a first message queue, wherein the private area comprises a second message queue, and wherein the computer-executable instructions further cause the first server to store the second message in the second message queue.

17. The computer program product of claim 15, wherein before adding the routing information to the first message, the computer-executable instructions further cause the first server to determine the routing information based on configuration information, and wherein the configuration information comprises a correspondence among identifiers of message queues in different data centers, an identifier of the first application, and an identifier of a second application that processes the second message.

18. The computer program product of claim 17, wherein the computer-executable instructions further cause the first server to obtain the configuration information from a configuration center.

19. The computer program product of claim 18, wherein the computer-executable instructions further cause the first server to record the configuration information in a third-party server, and wherein the third-party server does not belong to the first data center or the second data center.

20. The computer program product of claim 15, wherein the second data center comprises a management server configured to manage a second storage server in the second data center, wherein the routing information comprises an Internet Protocol (IP) address of the management server, and wherein the computer-executable instructions further cause the first server to send the second message to the management server based on the IP address of the management server to enable the management server to store the second message in the second storage server.

* * * * *